April 2, 1963 — D. P. COTTER — 3,083,593

DRILL GUIDE MEANS

Filed March 2, 1962 — 2 Sheets-Sheet 1

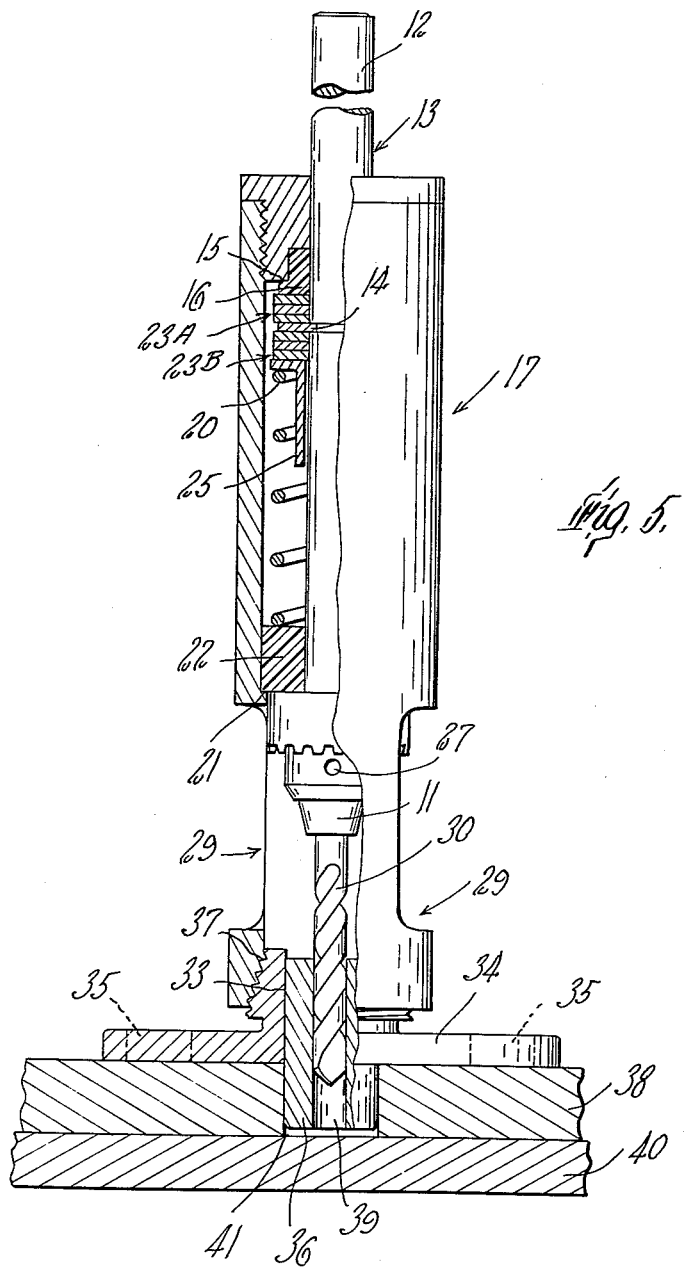

United States Patent Office 3,083,593
Patented Apr. 2, 1963

3,083,593
DRILL GUIDE MEANS
Donald P. Cotter, Scituate, Mass., assignor to Nasoba Engineering Corporation, Acton, Mass., a corporation of Massachusetts
Filed Mar. 2, 1962, Ser. No. 117,049
1 Claim. (Cl. 77—55)

This invention relates to drill guide means and more particularly to bushing guided drill means for use with a jig during a precision drilling operation.

During precision drilling operations on sheet metal workpieces, it has long been the practice to make a jig or pattern of soft metal which fits over the piece to be drilled. The jig has holes pre-drilled therein where it is desired to have the holes placed in the piece to be drilled. Since the jig is made of soft metal which would be subject to excessive wear if left unprotected, it has been the nearly universal practice to line the holes in the jig with a bushing of hardened metal having a hole in the center thereof of a size just sufficiently large to accommodate the drill being used.

Unfortunately, the prior practice of lining each hole in the jig with a bushing is an expensive and cumbersome means to protect the jig, particularly where, as in aircraft manufacturing, hundreds of holes are drilled in a jig and then each is lined with a bushing.

It is therefore one object of the invention to provide novel bushing means for a drill which eliminates the necessity of lining each hole of the jig with a bushing.

Still a further object of this invention is to provide relatively inexpensive and simple means to accomplish the foregoing enumerated purposes.

In general, these objects of the invention are accomplished by providing a frame element adapted to receive and retain in the central portion thereof drill means adapted to drill holes in a workpiece. The drill means are mounted in longitudinally movable relation to the frame element and spring means are provided to maintain the drill means in a longitudinally retracted position when the drill means are not in operation. A bushing prealigned with said drill means is provided at the end of the frame element and the drill means is adapted to be positioned with its tip within the end of said bushing when maintained in its longitudinally retracted position and to be extended with its tip beyond the bushing means into a longitudinally extended position of the drill means with the body thereof within said bushing for drilling holes in said workpiece when drill seating and drilling forces are imposed on the frame element in opposition to said spring means.

Other objects, features, and advantages of this invention will become apparent to those skilled in the art from the following detailed description of preferred embodiments thereof together with the accompanying drawings, wherein:

FIG. 5 is a cross section view of another embodiment of this invention.

Figure 1:
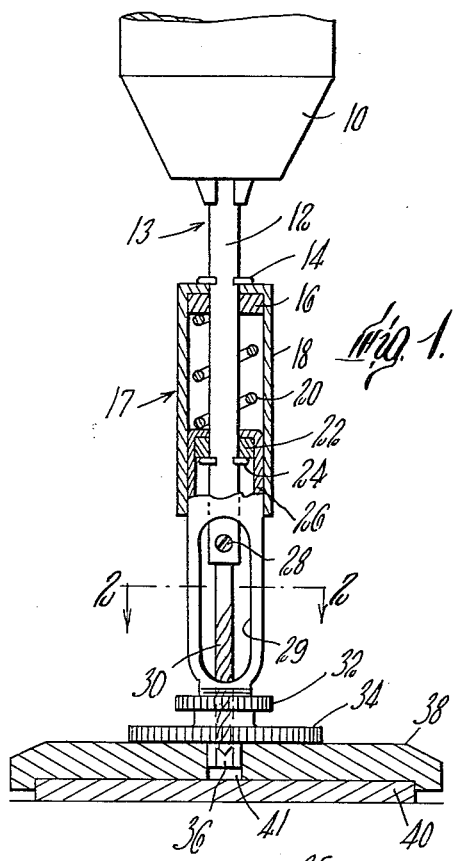
FIG. 1 is a cross section of one embodiment of this invention.

Referring to the drawings, FIG. 1 discloses a first preferred embodiment of this invention. In general, drill means 13 comprises a shaft or drill holding means 12 designed at its upper end to fit within a standard drill chuck 10, a drill bit 30 and drill retaining means 28, which extends downwardly into and which is rotatably mounted in the central portion of a two piece frame means 17 which consists of upper and lower frame elements 18, 26. At its lower end the drill holding means 12 is designed to accommodate a drill bit 30 of predetermined size, and has drill retaining means comprising an inwardly extending set screw 28 with which to fasten said drill bit 30 within said drill holding means 12. Said drill holding means 12 extends downwardly through the chamber enclosed by said upper frame element 18 and into the chamber enclosed by the lower frame element 26 and has upper and lower annular grooves at 14 and 24 positioned thereat. The upper annular groove at 14 is located just above the upper end of said upper frame element 18 and said lower annular groove at 24 is spaced below the upper end of said lower frame element 26. Removably inserted in said annular grooves are upper and lower annular retaining means 14, 24 which may comprise snap rings. Said retaining means 14, 24 operate to maintain the longitudinal position of the drill holding means 12 within said upper and lower frame elements 18, 26 along the longitudinal axis thereof and to define the maximum distance between the upper ends of said upper and lower frame elements 18, 26 when in their fully extended position.

The upper frame element 18 houses the upper portion of the drill holding means 12 and extends downwardly to a position somewhat below the upper end of the lower frame element 26. Just below the upper retaining means 14 the upper frame element 18 is turned inwardly to form an annular hole through which the drill holding means 12 extends.

The lower frame element 26 has a radius equal to that of the upper frame element 18 minus the gauge of the material used in the construction of the upper frame element 18 and is telescopingly fitted at its upper portion within the lower portion of the upper frame element 18. The portion of the lower frame element 26 which extends below the upper frame element 18 is slotted at 29 to permit the exit of drill chips, etc., from the chamber formed thereby, and to make accessible the set screw 28 of the drill holding means 12. The upper end of the lower frame element 26 is inwardly bent to provide an annular hole through which the drill holding means 12 extends. At the lower end of the lower frame element 26, and in alignment with the drill holding means 12, is a hole 37, shown more clearly in FIG. 3, having a radius larger than any drill bit 30 for which a specific device is intended to be used.

Inserted in the hole 37 is a bushing or guide means 36 having a hole 39 in its center slightly greater than the diameter of the particular drill bit 30 being used in the drilling operation. The outside radius of the exposed portion of the guide means is similarly slightly less than that of the bore 41 in the jig 38 being used. The exposed portion of the bushing 36 extends downwardly less than the thickness of the jig locating hole 41 as is defined by the flange 45 of the lower frame element 26.

Upper and lower bearings 16, 22 are also provided in the frame elements. In the preferred embodiment an oilite or dry bearing is used. The upper bearing 16 is located directly beneath the upper end of the upper frame element 18. The lower bearing 22 is located just beneath the upper end of the lower frame element 26 and above the lower retaining means 22.

Compression spring means 20 are interposed between the upper bearing 16 and the upper end of the lower wall means 26 to normally maintain upper and lower frame elements 18, 26 in their longitudinally extended position and so to keep the drill bit 30 retracted within the bushing 36 when not in actual use.

In the first preferred embodiment of the invention, a positioning plate 34 having an extended surface perpendicular to the longitudinal axis of the device is provided to assure a right angle relationship between the drill bit 30 and the jig 38 with its underlying workpiece 40. The plate 34 has a threaded hole 33 which screws onto the lower end of the lower wall means 26 as shown in FIG. 3. Above the plate 34 is a locknut 32 which is used to secure the position of the plate 34. As is more clearly shown in FIG. 2, the plate 34 is provided with viewing holes 35 to permit observation of the bushing 36 as it is inserted into the jig hole 41.

Figure 2:
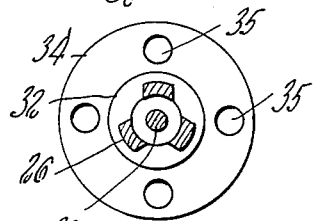
FIG. 2 is a cross section of the lower frame of FIG. 1 taken along the line 2—2 of FIG. 1.
Figure 3:
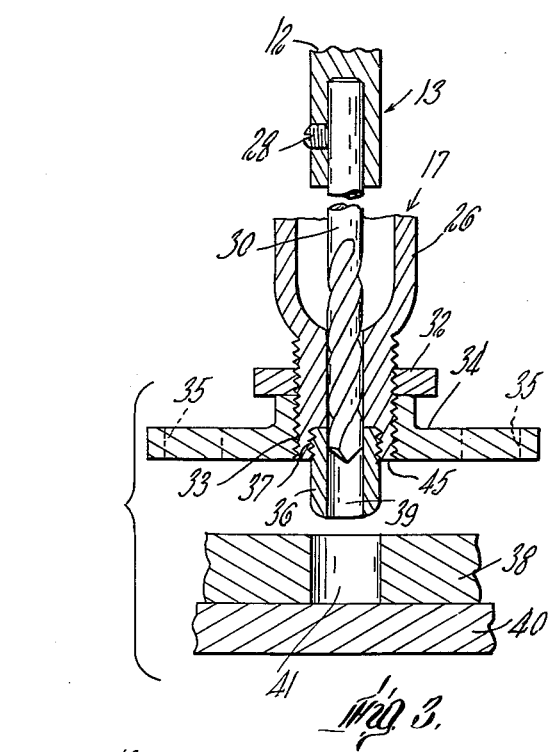
FIG. 3 is a cross section detail view of the lower frame of FIG. 1.
Figure 4:
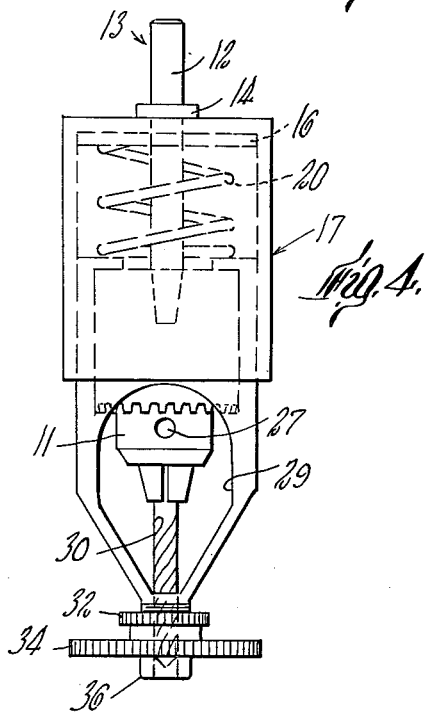
FIG. 4 is a cross section view of a modification of the embodiment of FIGS. 1-3.

In FIG. 4 is shown a modification of the embodiment of FIGS. 1–3 which comprises what has been heretofore described in conection with said Figures. except that the drill holding means 12 has a standard drill chuck 11 which can accommodate various size drill bits 30. The bushing 36 is removable thus permitting interchange of bushings 36 as the size of the drill bit 30 is altered. The keyhole 27 is exposed through the pierced side 29 of the lower frame element 26.

In FIG. 5 is shown a second preferred embodiment of the invention wherein the frame means 17 comprises a one-piece frame element. As in FIG. 4 the drill holding means 12 has a standard drill chuck 11 which can accommodate various size drill bits 30. In essence, the principle of operation of the embodiment shown in FIG. 5 is the same as those shown in FIGS. 1 and 4 although there are variances in the details of construction. Thus, the upper retaining means 14 is positioned in an annular groove of said drill means at 14 just below the upper bearing 16. The lower retaining means 24 is omitted. The lower bearing 22 is positioned within the same chamber as upper bearing 16 and the bearings 22, 16 are respectively reinforced and maintained in position from below and above at 21 and 15. The spring means 20 is interposed between the lower bearing 22 and the upper retaining means 14. Preferably washer 23A, 23B are positioned on either side of the retainer means 14 and a collar 25 having a flange abutting the lower washers 23B is positioned intermediate the spring means 20 and the lower washer 23B. Other modifications are shown at the lower end of the device. Thus, the positioning plate 34 is inserted in the threaded hole 37 of the frame means 17 and the bushing means 36 is inserted in hole 33 of the plate 34.

In practice the drill guide means is inserted in a standard drill chuck 10 of a conventional electric hand drill, for example. A drill is inserted in the drill holding means 12 and is fastened in place by tightening the set screw 28. The bushing 36 is inserted in a jig locating hole 41 with the surface of plate 34 in engagement with the surface of jig 38, the bushing 36 extending therebeyond for a distance less than the jig thickness at bore 41 so that it will not bottom against workpiece 40. The chuck 10 is then rotated and pressed toward the workpiece to rotate the drill bit 30 and move it to a longitudinally extended position beyond bushing 36 in opposition to compression spring 20 to drill a hole in workpiece 40 in a predetermined position located by bore 41 in jig 38. Thereafter the device may be moved to other jig bores as required.

It will be understood by those skilled in the art that still further modifications and changes of design are possible without departing from the spirit of this invention or its scope as defined by the appended claim.

What is claimed is:

Drill guide means comprising downwardly extending bushing means having a vertical hole centrally placed therein, a pierced lower frame element fixedly attached to said bushing means, flange means at the juncture of said bushing means and said lower frame element, said flange means defining the downward protrusion of said bushing means, an upper frame element in longitudinally movable relation to said lower frame element and in longitudinally fixed relation to drill holding means, drill holding means centrally and rotatably mounted within said upper and lower frame elements and in longitudinally fixed relation to said upper frame element, said drill holding means extending upwardly through said upper frame element and downwardly through the chamber enclosed by said upper frame element and partially into the chamber enclosed by said lower frame element, upper and lower annular grooves on said drill holding means, said upper annular groove being above the juncture of said drill holding means and said upper frame element, and said lower annular groove being below the juncture of said drill holding means and said lower frame element, upper and lower annular retaining means removably inserted in said upper and lower annular grooves, spaced upper and lower bearing means fixedly attached to said upper and lower frame elements and having centrally located therein annular bearing surfaces in contact with said drill holding means, said upper bearing means being located within the chamber enclosed by said upper frame element, and said lower bearing means being located within the chamber enclosed by said lower frame element and above said lower annular retaining means, and compression spring means interposed between said upper bearing means and the upper end of said lower frame element.

References Cited in the file of this patent
UNITED STATES PATENTS 2,170,211    Osborne    Aug. 22, 1939
2,539,223    Bellek    Jan. 23, 1951